Figure 1:
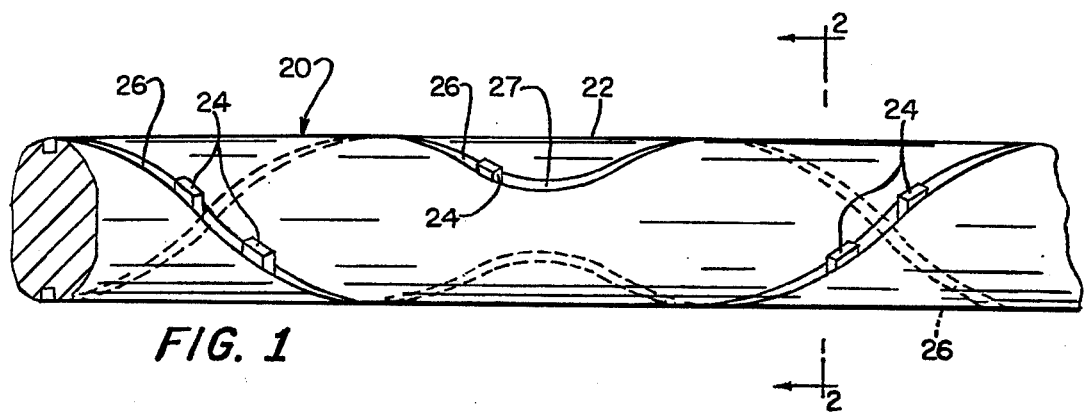

United States Patent [19]

Hall

[11] 4,016,857
[45] Apr. 12, 1977

[54] EPOXY BOND DIAMOND SAW

[76] Inventor: George H. Hall, P.O. Box 244, Westford, Mass. 01886

[22] Filed: Nov. 24, 1975

[21] Appl. No.: 634,828

Related U.S. Application Data

[63] Continuation of Ser. No. 513,716, Oct. 10, 1974, abandoned.

[52] U.S. Cl. .................................. 125/21; 125/18
[51] Int. Cl.² .......................................... B28D 1/08
[58] Field of Search .................. 125/12, 13, 15, 21, 125/18; 51/206 R

[56] References Cited

UNITED STATES PATENTS

| 125,804 | 4/1872 | Gear | 125/12 X |
| 2,003,994 | 6/1935 | D'Avocourt | 125/21 |
| 3,146,561 | 9/1964 | Lindblad | 125/15 X |
| 3,221,728 | 12/1965 | Lindblad | 125/15 |
| 3,343,308 | 9/1967 | Fessel | 125/15 X |
| 3,383,807 | 5/1968 | Miller | 51/206 R |

Primary Examiner—Harold D. Whitehead
Attorney, Agent, or Firm—Schiller & Pandiscio

[57] ABSTRACT

A cutting tool is disclosed comprising a plurality of blocks of composite, comminuted abrasive in a metal matrix, resiliently mounted to a metallic substrate by an elastically pliant epoxy based adhesive. In a preferred embodiment of the invention a relatively thin layer or film comprising a flexible metal such as copper, metallurgically bonded to the metal matrix, is sandwiched between the blocks and the epoxy adhesive, and contributes to the resiliency of the mounting, and promotes bonding to the epoxy.

3 Claims, 2 Drawing Figures

U.S. Patent

April 12, 1977

4,016,857

EPOXY BOND DIAMOND SAW

This is a continuation of application Ser. No. 513,716 filed Oct. 10, 1974 and now abandoned.

This invention relates to cutting tools and more particularly to cutting tools of the type which employ abrasive composites as cutting elements, and new methods of making such tools.

Composites formed of finely comminuted abrasive particles, such as diamond dust or grit, disposed in a metal or ceramic matrix are used extensively as the cutting elements in tools used for slicing large blocks of minerals such as marble, granite and the like. For cutting large blocks of such minerals, particularly to make architectural facings, the prior art has used very large cutting tools which have posed a number of problems. For example, one of the prior art systems employs a solid rotary blade with a number of diamond/metal matrix composite blocks bonded to the periphery of the blade as the abrasive cutting elements. Making wide cuts requires a large blade (e.g., with a radius of 6 feet or more). Such a rotary blade tends to flex laterally with respect to its plane of rotation. Hence, such blades tend to be very thick to impart structural rigidity necessary to provide clean cuts. This thick blade cuts an equally thick swath and is therefore slow, produces an excessive amount of swarf while destroying valuable mineral, is wasteful of abrasive material and is obviously quite expensive to operate.

Alternatively, oscillating blades have also been used in which the diamond composites have been fixed to the cutting surface of the saw. The operation of an oscillating blade is considerably slower than that of the rotary blade and fairly complex equipment is required to oscillate the sawblade to achieve a cut of any substantial architectural size. Further, the same lateral flexing problem requires that the blade must also be reinforced and hence tend to be thick and wasteful of both abrasive and mineral in operation. Also, sawing rates with this type of equipment typically is relatively slow due to limitations in the surface speed at which the cutting elements can be moved.

In either case, when using a substantially rigid blade the abrasive composite elements providing the cutting units for the system are subject primarily to shear forces due to the cutting motion of the saw. Hence, the structure which is used to fix the abrasive composites to the blade need only be designed to withstand the shear forces acting substantially parallel to the direction of the cutting motion of the blade.

Still another system which has heretofore been used, particularly for cutting large blocks of granite employs a twisted wire and a slurry of silicon carbide grit as the abrasive cutting elements. However, this system also is relatively slow, consumes a large quantity of silicon carbide which is somewhat expensive, and also requires a large quantity of fresh water for washing and cooling. This latter requirement has become a particular problem in recent times due to recently enacted pollution control laws which have forced closings of some quarrys employing this type of cutting system.

While it has been suggested that wire or band saws can be used to cut minerals to large dimensions, abrasive composites bonded to the surface of such a wire saw will be subject not only to the shear forces due to the cutting motions of the saw but, inasmuch as wire or band saws are in the form of endless belts which are necessarily bent around sheaves, the saw must flex laterally for proper operation. Abrasive elements bonded to the saw must necessarily withstand the tensile forces arising out of blade flexure which would tend to peel off or at least weaken the bonding to the abrasive elements to the blade so that the abrasive elements will ultimately be sheared off.

Composite abrasive elements formed by admixing diamond grit for example in a metal matrix, have been bonded by the prior art to a metallic substrate mostly by either electrolytic bonding processes or sinter bonding processes.

Prior art electrolytic bonding techniques typically may require relatively long and commercially unacceptable deposition times, especially where relatively dense deposits are desired. Additionally, oxide films often present on the metallic substrate may adversely affect adhesion. Accordingly, the art has typically carried out electrolytic depositions in inert or reducing atmospheres, and in some instances also may apply a flux to the metallic surface prior to deposition. Such procedures obviously increase production costs.

Sinter bonding techniques are generally faster than known electrolytic bonding techniques, but require elevated temperatures which presents other problems. For example, sinter bonding may typically require temperatures approaching 80% or more of the melting temperature (in degrees Kelvin) of the bonding matrix; typically a metallic or ceramic material which may melt or degrade at 1200°–1500° K or higher. At such temperatures metallurgical properties of the metallic substrate may be adversely affected. Also, diamonds exposed to such temperatures may suffer some deterioration from graphitization. For example, graphitization of diamonds will occur relatively rapidly at a temperature of about 1000° K; even below 1000° K graphitization may still occur, although at a somewhat slower rate. The latter problems may be overcome by carrying out the sintering process in a non-oxidizing atmosphere, but at an increased operating cost.

Furthermore, composite abrasive connected to a wire or band saw by either sinter bonding or electrolytic bonding generally have not been satisfactory because the bonds usually fail to show a long term stability.

Another technique of bonding composite elements to a metallic substrate involves a brazing process according to the method disclosed in my copending application Ser. No. 380,831, filed July 19, 1973. According to this process, an abrasive tool is formed by brazing one or more composite cutting elements to a metallic substrate which maybe a wire or band saw. The braze comprises at least three layers including a pliantly elastic metallic layer sandwiched between a pair of bonding layers of a metal which melts below the melting point of either the substrate or matrix metal and bonds well to both the latter. To apply the braze, one positions the three layer sandwich between an abrasive composite block and the substrate, holds the block, sandwich and substrate together under pressure, and heats the sandwich to brazing temperature by passing an electric current through the substrate. An advantage of this process is that heating may be effected relatively rapidly with the result that the diamond particles are subjected to high temperature for only a relatively short period of time, whereby high-temperature deterioration of the diamonds may be kept to a minimum. Another advantage is the elimination of substantial equipment often required by the prior art, e.g., for carrying out heating in inert or reducing atmospheres. On the other hand, cutting tools formed using this technique occasionally may not possess the desired strength, apparently because the metallic substrate is believed to occasionally be weakened by heating to the required brazing temperatures.

It is thus a primary object of the present invention to provide a novel wire saw and a method of forming such a saw which overcomes the aforesaid problems of the prior art. Another object of the present invention is to provide such a method which, on the whole, is substantially simpler than many of the prior art methods and particularly which allows bonding of a composite matrix to a substrate which is to be flexed, so that continual flexure of the substrate, at least to a limited extent, is not expected to seriously degrade the bond. Yet another important object of the present invention is to provide a novel wire saw structure which permits rapid and economical cutting of large blocks of architectural mineral material at high speeds with a narrow cut.

Other objects of the invention will in part be obvious and will in part appear hereinafter. The invention accordingly comprises the processes involving the several steps and the relation of one or more of such steps with respect to each of the others, and the products possessing the features, properties and relation of elements which are all exemplified in the following detailed disclosure and the scope of the application of which will be indicated in the claims.

Generally, to effect the foregoing and other objects the present invention contemplates forming an abrasive tool by adhesive bonding one or more composite elements comprising comminuted abrasive in a metal matrix to a metallic substrate. The adhesive comprises an elastically pliant epoxy material such as an epoxy resin. In a preferred embodiment of the invention, a relatively thin layer or film of a flexible metal such as copper, metallurgically bonded to the metal matrix, is sandwiched between the composite elements and the epoxy adhesive. The metal film acts as shock absorber, and also promotes bonding to the epoxy.

The metallic substrate is preferably a steel wire exhibiting negligible elongation under extreme tension short of its elastic limit, the wire preferably having two spiral grooves opposite one another. The cutting elements are bonded in place in the grooves as a series of spaced teeth, using an elastically pliant epoxy based adhesive as above mentioned. The wire is arranged in an endless belt and held in tension between at least two sheaves having grooves lined with a comparatively soft, elastic material which the abrasive elements can engage without substantially tearing, cutting or gouging. Further details of the arrangement of the wire are described in my aforesaid copending application Ser. No. 380,831.

Figure 2:
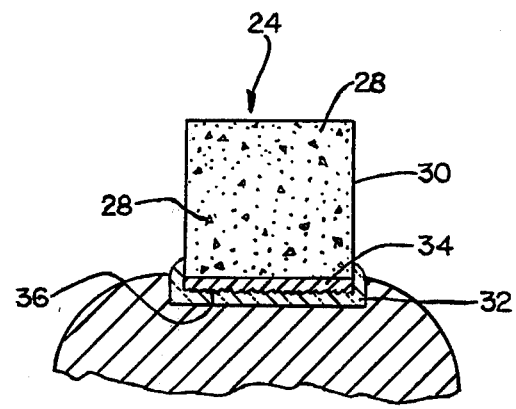

For a fuller understanding of the nature and objects of the present invention, reference should be made to the following detailed description taken in connection with the accompanying drawings wherein:

FIG. 1 is a fragmentary perspective view of a portion of an abrasive cutting tool of the instant invention; and FIG. 2 is an enlarged cross-sectional view of a portion of the tool of FIG. 1 taken along line 2—2.

Referring now to the drawings there is shown a preferred embodiment of cutting wire 20 of the instant invention in the form of an elongated body or substrate member 22 made of a metal such as steel wire or the like. Body 22 is shown as having a generally elliptical cross-section although it will be understood that body 22 may have a cross-section of a variety of shapes and may be, for example, circular, triangular or square. Body 22 supports a plurality of abrasive segments or blocks 24 as will be described in detail hereinafter.

Body 22 has one or more relatively thin, narrow notches or slots 26 formed on its surface, diagonal to its length. Preferably slots 26 are in the form of elongated grooves, e.g., as shown in FIG. 1, forming a helix around the long axis of body 22. It will be understood, however, that slots 26 may also comprise a plurality of short notches (not shown) which are preferably arranged substantially on a helical line along body 22. In either case it is preferred that the twist direction of the helix or helical line be reversed along the wire, (e.g., every 15–20 feet) as at 27. This latter feature has been found to provide an especially straight surface cut when the wire is used as a band saw in accordance with the teachings in my aforesaid copending application Ser. No. 380,831.

A plurality of relatively short abrasive segment blocks 24 are mounted in spaced-apart relation in slots 26. Blocks 24 typically comprise a mixture of diamond particules, e.g., diamond bits and grit 28 in a bonding matrix 30, all as well known in the art. The size of the diamond particles 28 and the proportion of particles to bonding matrix are not critical to the invention, and may be varied over a wide range as is well known in the art. Thus for example, blocks 24 may comprise diamond particles varying in size in the range of from 1 to 1200 microns, and may be present in an amount in the range of 5 to 74 volume percent, based on the amount of bonding matrix.

Abrasive element blocks 24 are held in slots 26 by a layer or film 32 of an elastically pliant epoxy based adhesive. A great number of epoxy based adhesives are known in the art, are available commercially and are suitable for use in the present invention. A typical epoxy is derived by the reaction of bisphenol A and epichlorohydrin and is believed to have the general formula:

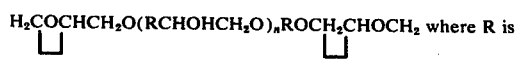 where R is

.

Variations of this basic composition may be produced by varying the ratio of bisphenol A to epichlorohydrin, the conditions of reactions and the catalyst or agent and conditions used for final curing. Before curing such epoxies typically are relatively viscous liquids, or they may be relatively low melting point solids, e.g., having melting points below about 175° C. Curing involves further reaction of the epoxy and hydroxy groups to cause chain growth and cross linking and is typically accomplished by heating, or the reaction may be induced by the presence of a catalyst such as a boron trifluoride amine or polyamine, a dibasic acid anhydride or a phenolic or urea resin. Also, the epoxy and hydroxy groups may be esterified with unsaturated monobasic acids and curing then occurs as with catalysts comprising an alkyd resin. The cured epoxy materials (typically referred to in the art as "epoxy resins") exhibit properties of high adhesive strength which in many cases may be stronger than that of the bonding matrix 30.

It will be appreciated, as above noted, that the wire is intended to flex. Hence, to avoid cracking matrix 30 by forces arising during flexure of wire 20 and to resist the tendency of the bond to peel occasioned by blade flexure, an important feature of the present invention is the ability of the bonding system to flex and thereby absorb the forces arising during the flexure of wire 20. Also, the bonding system should also act as a cushion to prevent blocks 24 from contacting the wire. In some instances the epoxy layer 32 may be sufficiently flexible to satisfy the aforesaid flexibility and cushioning requirements. For example, mixtures of epoxy resins with one or more of polyamine resins, polysulfide rubbers, and polyurethanes are known in the art to possess strength and flexibility. On the other hand, some of the known high strength epoxy based adhesives may not possess sufficient flexibility. In such instances, in order to provide the required flexibility and cushioning to the bond, a relatively thin layer or film 34 of a flexible metal such as copper is metallurgically bonded to block 24 as an interface between the blocks and the adhesive 32. The use of the layer of copper imparts an additional degree of flexibility at the bond between blocks 24 and body 22. This added degree of flexibility provides two fold advantages. For one, materials such as cobalt which has especially good wear characteristics and also is known to bond strongly to diamond, but is relatively brittle and inflexible, may be successfully used as a principal matrix material. Another advantage is that the wire may be bent around a comparatively small radius, with the result that the wire saw of the present invention may be used over most present saws without modification. If desired, the bottom surface of layer 34 may be scored or roughened, e.g., as at 36 so as to increase its surface area and to also provide a "key" for the adhesive layer 32, thus further contributing to the strength of the bond between blocks 24 and wire 20. Alternatively, blocks 24 may comprise principally copper as matrix material, e.g., up to about 70% copper, or some other malleable metal, and include lesser amounts of other metals such as iron, zinc, tin, titanium, chromium, zirconium and the like. The use of copper as the principal matrix material may impart sufficient flexibility to blocks 24 so that film layer 34 may not be required. On the other hand, copper does not wear as well as cobalt, and also does not bond as strongly to diamond as does cobalt. In either case blocks 24 are formed as an unitary mass, e.g., by sintering the bonding matrix (and the film) by techniques well known in the art.

Layers 32 and 34 may be the same or different thickness, depending on the nature of the epoxy adhesive, the length of the adhesive bond lines, flexibility of the adhesive, the matrix material and the film material, and flexibility and cushioning desired. Preferably the total thickness of layers 32 and 34 is such as to substantially fill slot 26 whereby the blocks 24 will be positioned adjacent the surface of wire 20. For example, if slots 26 are about 0.020 inches deep throughout their length, layers 32 and 34 typically may each be about 0.010 inches thick. Thus layers 32 and/or 34 form a cushion or barrier which serves to prevent diamond particles in blocks 24 from penetrating the layers and cutting or nicking wire 30 and therefore from creating stress concentration points at which the wire may bend to break.

To form a wire saw according to the present invention, a layer of adhesive 32 typically is laid in slots 26, e.g., as a liquid, before curing. Then abrasive blocks 24 having integral layer 34 are positioned in slots 26 on top of layer 32. The blocks are then clamped, under pressure, to layer 32 and the blocks and body 22 are then bonded together by curing the adhesive to form an epoxy. Heat may or may not be required for curing, depending on various factors including composition of the adhesive and curing agents used. However, in the case where curing is affected by or aided by heating, it will be understood that the temperatures involved are quite low as compared with temperatures typically involved in prior art brazing techniques. Thus a typical epoxy curing temperature may be in the range of 125°–175° C, as compared with brazing temperatures which typically are 700° C or more. Thus the bonding procedure of the present invention has a number of important advantages. For one, heating (if required at all) may be effected at a relatively low temperature with the result that the diamond particles are not subjected to high temperature, whereby high-temperature deterioration of the diamonds does not result. Another advantage is the elimination of substantial equipment often required by the prior art, e.g., for carrying out electrolytic or sinter bonding in inert or reducing atmospheres.

The invention will now be described with reference to the following examples, which however, are presented herein merely in an illustrative and not a limiting sense.

EXAMPLE I

Referring now to FIGS. 1 and 2, a band type wire saw is formed using principles of the present invention.

Maraging steel wire available from Hamilton Precision Metals, Lancaster, Penn., U.S.A. as type No. 250 is used as the substrate member 22. The manufacturer describes this wire as cold worked and maraged steel comprising substantially 18% Ni, 7.7% Co., 4.9% Mo, 0.4% Ti, less than about 0.1% of each of C, Mn, Si, Al, B, Zr and Ca, all parts by weight, the balance iron. This material, having a cross-section area of about 0.2 square inches has a tensile strength of about 270,000 psi max.

Two helical slots 26 are preferably cold rolled into the surface of the wire substrate to avoid providing any cuts or nicks on the inside surface of slots 26. Slots 26 are each about 0.100 inches wide and about 0.017 inches deep throughout their length. Slots 26 complete a twist around substrate member 22 every 36 inches; the helices are 180° out-of-phase with each other. The twist direction of the helices is reversed every 15 feet along the length of the wire substrate member 22.

A plurality of abrasive element blocks 24 are formed as follows:

Blocks 24 comprise a unitary mass of diamond particles in a bonding matrix. The diamond particles comprises a mixture of different size diamond particles, as follows: 20 volume percent of 20–30 mesh, 30 volume percent of 30–40 mesh, and 50 volume percent of 40–60 mesh (all mesh sizes Tyler Standard Screen Scale sieves series). The diamond particles are mixed with a bonding matrix comprising about 69% copper, 11% zinc, 8% ivory, 2% tin, 3% titanium, 2% chromium, 1% zirconium, the balance 4% of Easy-Flo 3, a brazing powder available commercially from Hardy and Harman, New York, N.Y. The manufacturer describes this latter produce as comprising about 50% silver, 16% cadmium, 15.5 of each of copper and zinc, and 3% nickel, (all percentages by weight). The mixtures of diamond particles are mixed with the bonding matrix in a 1-to-10 volume ratio typically. The mixture of diamond particles and bonding matrix is shaped and compressed into blocks having a length of 0.5000 inch, width of 0.09 inches and height of 0.07 inches. Oxygen free copper shim material having a length of 0.500 inches, width of 0.010 inches and thickness of 0.010 inches are clamped onto one side of the shaped blocks. The shaped blocks with the copper shims then are heated to cure the bonding mixture, e.g., typcially the mixture is heated to 955° C and held at that temperature for 3–5 seconds. Blocks 24 result having a length of about 0.500 inches, width of about 0.100 inches and height of about 0.080 inches, and have a metallurgically bonded layer 32 of copper about 10 mil thick on one side of the block.

An epoxy/nylon based adhesive available from Dexter Chemical Corporation, Olean, N.Y. U.S.A. as type EA 9651 Film is used as the adhesive. The manufacturer describes this adhesive as a high peel, high strength, epoxy nylon. It is available as a solvent-free unsupported film 10 mil thick. The adhesive utilizes a cure of 60 minutes at 350° F. A film of this adhesive is placed into slots 26.

The shaped, sintered blocks 24 are clamped into slots 26, with the copper layer side in contact with the epoxy film, and spaced apart from each other by 0.5 inches. The blocks are held in position on the wire under about 25 psi pressure.

Wire 20 with the assembled blocks 24 is then heated to raise the temperature of the assembly to about 175° C, held at that temperature for about 60 minutes, and then allowed to air cool. Upon release of pressure of blocks 24, the latter are found to be securely bonded to substrate of wire 20.

The resulting wire is arranged as an endless belt and used as a wire saw in accordance with the teachings of my aforesaid copending application Ser. No. 380,831.

The wire was used for cutting granite blocks for 200 hours without failure.

EXAMPLE II

The procedure of Example I is repeated in which, however, the copper layer is eliminated, and the adhesive is type 2214 available from Minnesota Mining and Manufacturing Company, St. Paul, Minn. The manufacturer describes this adhesive as a high-flex aluminum filled structural adhesive epoxy. The adhesive is a viscous liquid at room temperature, and utilizes a cure of 60 minutes at 120° C. The adhesive is applied in sufficient quantity to substantially fill slots 26. A wire saw is obtained as in Example I.

Since certain other changes may be made in the above apparatus and process without departing from the scope of the invention herein involved, it is intended that all matter contained in the above description and shown in the accompanying drawing shall be interpreted in an illustrative and not in a limiting sense.

What is claimed is:

1. A wire saw comprising in combination:
   an elongated metallic wire body of sufficient flexibility to be formed into a laterally flexible endless loop capable of being driven around at least a pair of sheaves;
   a plurality of blocks of composite comminuted abrasive in a bonding matrix mounted in spaced-apart relation to one another along said body; and
   a plurality of layers of flexible metal, each layer being metallurgically bonded to a corresponding one of said blocks and sandwiched between said body and said corresponding block so as to extend substantially completely between each of said corresponding blocks and said body, each of said layers being bonded to the periphery of said body by an elastically pliant, epoxy-based adhesive.

2. A wire saw as defined in claim 1 wherein said body is a substantially cylindrical body having at least one helical slot along its length, said blocks being mounted in said spaced-apart relation in said at least slot.

3. A wire saw as defined in claim 2, wherein the twist direction of said slot is reversed along the wire.

* * * * *